(12) United States Patent
Yang et al.

(10) Patent No.: US 12,507,329 B2
(45) Date of Patent: Dec. 23, 2025

(54) LIGHTING APPARATUS WITH MIXED MULTI-CODES TRIGGERED BY POWER LINE EDGE SIGNALS

(71) Applicant: HANGZHOU YUN LED CHIP PHOTOELECTRICITY TECH. CO., LTD., Hangzhou (CN)

(72) Inventors: Yinghan Yang, Hangzhou (CN); Zixun Zhang, Hangzhou (CN)

(73) Assignee: HANGZHOU YUN LED CHIP PHOTOELECTRICITY TECH. CO., LTD., Hangzhou (CN)

( * ) Notice: Subject to any disclaimer, the term of this patent is extended or adjusted under 35 U.S.C. 154(b) by 154 days.

(21) Appl. No.: 18/215,800

(22) Filed: Jun. 28, 2023

(65) Prior Publication Data

US 2023/0345599 A1 Oct. 26, 2023

Related U.S. Application Data

(63) Continuation of application No. PCT/CN2021/140708, filed on Dec. 23, 2021.

(30) Foreign Application Priority Data

Jan. 13, 2021 (CN) .......................... 202110041784.2

(51) Int. Cl.
*H05B 45/20* (2020.01)
*H05B 47/185* (2020.01)

(52) U.S. Cl.
CPC ........... *H05B 45/20* (2020.01); *H05B 47/185* (2020.01)

(58) Field of Classification Search
CPC ....... H05B 45/20; H05B 47/185; H05B 45/32
See application file for complete search history.

(56) References Cited

U.S. PATENT DOCUMENTS

| 7,012,382 B2 * | 3/2006 | Cheang | ................. | H05B 45/20 |
| | | | | 315/149 |
| 10,561,005 B1 * | 2/2020 | Peng | ...................... | H05B 45/50 |
| 2009/0289578 A1 * | 11/2009 | Peng | ...................... | H05B 45/22 |
| | | | | 315/294 |

(Continued)

FOREIGN PATENT DOCUMENTS

| CN | 103747582 A | 4/2014 |
| CN | 107426861 A | 12/2017 |

(Continued)

OTHER PUBLICATIONS

International search report in Application No. PCT/CN2021/140708, mailed on Mar. 1, 2022.

*Primary Examiner* — Minh Tran
(74) *Attorney, Agent, or Firm* — Syncoda LLC; Feng Ma

(57) ABSTRACT

A colored lighting apparatus with mixed multi-codes triggered by power line edge signals, including a power line edge signal generator for generating address signals and light control signals and loading them onto the power line; multiple LED modules, each including a multi-color LED group and an LED driver that drives the multi-color LED group based on the address signals and light control signals loaded from the power line; multiple LED modules including two or more LED modules, and multiple LED modules having two or more LED driver address codes, with the LED modules randomly mixed and arranged according to the LED driver address codes.

12 Claims, 4 Drawing Sheets

(56) References Cited

U.S. PATENT DOCUMENTS

2017/0094745 A1*  3/2017  Lai ........................ H05B 45/22
2021/0227667 A1*  7/2021  Wang ..................... H05B 45/48

FOREIGN PATENT DOCUMENTS

| CN | 108811241 A | 11/2018 |
| CN | 112672473 A | 4/2021 |
| CN | 113329539 A | 8/2021 |

* cited by examiner

LIGHTING APPARATUS WITH MIXED MULTI-CODES TRIGGERED BY POWER LINE EDGE SIGNALS

CROSS-REFERENCE TO RELATED APPLICATIONS

This is a continuation of PCT/CN2021/140708 filed Dec. 23, 2021, which claims priority to Chinese Patent Application No. 202110041784.2 filed Jan. 13, 2021. The disclosures of the above-referenced applications are hereby incorporated by reference in their entirety.

BACKGROUND

At present, there have been "arithmetic operation devices and light-emitting diode (LED) drivers triggered by power line edge signals" and "colored lighting apparatus based on power line edge signal control" (Chinese invention patents ZL201410632645.7 and ZL201410775449.5) in the market. Due to their high cost-effectiveness, these patented technologies have achieved mass industrial applications.

SUMMARY

The present relates to the field of LED colored lightings, and more particularly to a colored lighting apparatus with mixed multi-codes triggered by power line edge signals.

An objective of the present disclosure is to provide a colored lighting apparatus with mixed multi-codes triggered by power line edge signals, which solves the problem of achieving controllable all-synchronous color effects and controllable random flashing functions.

A colored lighting apparatus with mixed multi-codes triggered by power line edge signals comprises:
- a power line edge signal generator for generating address signals and light control signals and loading them onto a power line;
- a plurality of LED modules, each LED module includes a multi-color LED group and an LED driver for driving the multi-color LED group based on the address signals and the light control signals loaded from the power line;
- the LED driver includes an LED driver address coding;
- the LED driver of the LED module receives the address signals and the light control signals, and responds to drive the multi-color LED group based on the light control signals when the address signals are equal to the LED driver address coding;
- the plurality of LED modules include two or more LED modules, and with two or more LED driver address codings; the plurality of LED modules are randomly mixed and randomly arranged according to the LED driver address codings.

The plurality of LED modules includes N LED modules with M LED driver address codings, where N is greater than or equal to M. When N is greater than M, some of the LED modules use the same LED driver address coding.

The N LED modules are randomly mixed and randomly arranged in the colored lighting apparatus. The N LED modules in the colored lighting apparatus can be connected to the power line in parallel, in series, in a parallel-series connection, or in a series-parallel connection. The N LED modules are connected to form a common anode and a common cathode, and are connected between the common anode and the common cathode.

The LED modules are powered on when the voltage of the common anode is greater than the voltage of the common cathode.

As a preferred embodiment, the power line edge signal generator of the colored lighting apparatus includes a controllable switch and a control circuit. The input of the controllable switch is connected to a DC power supply, the output of the controllable switch is connected to the power line, and the control terminal of the controllable switch is connected to the control circuit. The control circuit controls the controllable switch to turn on or off, generating pulse signals. The plurality of LED modules is electrically connected to form a common anode and a common cathode, and are connected between the common anode and the common cathode. The common anode is connected to the power line, and the common cathode is connected to the ground. The controllable switch can be a single device or a combination of multiple devices, and the control terminal of the controllable switch can be a single control terminal or a combination of multiple control terminals.

As a preferred embodiment, a pull-down circuit is connected between the output terminal of the controllable switch and the ground. As a preferred embodiment, the pull-down circuit pulls down the voltage to the ground. Alternatively, the pull-down circuit can pull down the voltage to an intermediate potential higher than the ground.

As another alternative, the power line edge signal generator of the colored lighting apparatus includes a controllable switch and a control circuit. The input terminal of the controllable switch is connected to a common cathode, the output terminal of the controllable switch is connected to the ground, and the control terminal of the controllable switch is connected to the control circuit. The control circuit controls the controllable switch to turn on or off, generating the pulse signals. A common anode formed by the connection of the plurality of LED modules is connected to a DC power supply, and the input terminal of the controllable switch is connected to the common cathode formed by the connection of the plurality of LED modules. The controllable switch can be a single device or a combination of multiple devices, and the control terminal of the controllable switch can be a single control terminal or a combination of multiple control terminals.

When the controllable switch is turned off, there is no current path from the DC power supply, the controllable switch, and the multiple LED modules to the ground. As another embodiment, when the controllable switch is turned off, there is a current path from the DC power supply, the multiple LED modules to the ground that does not pass through the controllable switch.

When the controllable switch is turned off, it generates a low level voltage, and when the controllable switch is turned on, it generates a high level voltage. The pulse signal is generated by controlling the controllable switch from ON to OFF, or from OFF to ON. The pulse signal can be a high pulse or a low pulse. As another embodiment, the pulse signal can be a combination of high pulses and low pulses.

As a preferred embodiment, the power line edge signal generator of the colored lighting apparatus generates two sets of pulse signals by controlling the controllable switch from ON to OFF, or from OFF to ON. The first set of pulse signals is the address signal and the second set of pulse signals is the light control signal.

As a preferred embodiment, the pulse number of the first set of pulse signals is the address signal, and the LED driver counts the pulse number in the first set. When the pulse number in the first set is equal to the LED driver address coding, the light control signal is responded. As another embodiment, an encoding information is corresponded to the high level width or the low level with of the pulse signals. Furthermore, the correspondence between the encoding information and the width of the pulse signals should be understood as: different lengths of high level, or different lengths of low level, or a combination of different lengths of high level and low levels, represent different logic encoding information. As a preferred embodiment, a high pulse with a time length less than 100 us corresponds to logic 0, and a high pulse with a time length greater than or equal to 100 us corresponds to logic 1.

As a preferred embodiment, the second set of pulse signals in the colored lighting apparatus is the light control signal. The LED driver counts the pulse number in the second set, and the multi-color LED group state is determined by the pulse number of the second set when the pulse number of in the first set is equal to the LED driver address coding.

As a preferred embodiment, the LED driver includes an LED driver address coding, a pulse counting circuit, a multi-color LED group driving circuit, and a status control circuit;

the LED driver is controlled by the status control circuit to count the pulse number in the first and the second sets by the pulse counting circuit;

when the pulse number in the first set is equal to the LED driver address coding, the multi-color LED group state is determined by the pulse number in the second set.

As another implementation, the multi-color LED group state can be determined by the first set of pulse signals, and the second set of pulse signals can be used as the address coding signals.

As a preferred embodiment, the multi-color LED group includes a red light-emitting diode (R LED), a green light-emitting diode (G LED), and a blue light-emitting diode (B LED), and the LED driver drives the R LED, G LED, and B LED connected to it.

As a preferred embodiment, when the number of pulse signals in the first set is equal to the LED driver address coding: when the number of pulse signals in the second set is 1, the R LED is on; when the number of pulse signals in the second set is 2, the G LED is on; when the number of pulse signals in the second set is 3, both R LED and G LED are on; when the number of pulse signals in the second set is 4, the B LED is on; when the number of pulse signals in the second set is 5, both R LED and G LED are on; when the number of pulse signals in the second set is 6, both G LED and B LED are on; when the number of pulse signals in the second set is 7, all R LED, G LED, and B LED are on; when the number of pulse signals in the second set is 8 or 0, all R LED, G LED, and B LED are off.

The power line edge signal generator generates the address signal and the light control signal, and the plurality of LED modules are randomly mixed and arranged according to the LED driver address coding, achieving a controllable random flashing function.

The controllable random flashing function of the present disclosure can achieve a random and intense flashing light effect by flashing another color for a short period of time against a background color. Furthermore, through programming control, a rich and controllable random flashing function can be realized.

As a preferred embodiment, the controllable random flashing function refers to controlling the plurality of LED modules to operate in two or more states or modes by the address signal and the light control signal generated by the power line edge signal generator. The plurality of LED modules are randomly mixed and arranged according to the LED driver address coding to achieve the random flashing function of the colored lighting apparatus.

Furthermore, the random mixing and arrangement of the plurality of LED modules according to the LED driver address coding should be understood as follows: the arrangement of the plurality of LED modules in a given colored lighting apparatus according to the LED driver address coding is fixed; the arrangement of the plurality of LED modules according to the LED driver address coding is different among two or more colored lighting apparatus.

As one implementation of the controllable random flashing function, the power line edge signal generator generates the address signal and the light control signal to set the plurality of LED modules to maintain red for $T_1$ duration, then set one or more the LED modules corresponding to one or more address signals to white light for $T_2$ duration, and then set the one or more LED modules corresponding to the one or more address signals back to red. This process is repeated for different address signals or combinations of address signals to achieve a controllable random flashing function with red background and white light as the flashing color. Other implementations of the controllable random flashing function include setting other colors as the background and flashing colors. Furthermore, the function can be extended to achieve random flashing with two, three, four, five, six, seven, or eight colors.

The each LED module includes an LED driver that drives the multi-color LED group based on the address signal and the light control signal loaded from the power line. The colored lighting apparatus can be controlled to be in a fixed state by generating the address signal and the light control signal through the power line edge signal generator. When the power line edge signal generator emits all the address signals and corresponding light control signals are the same, the colored lighting apparatus is in the same color mode.

The plurality of LED modules are randomly mixed and arranged according to the LED driver address coding. By generating the address signal and corresponding the light control signal for each LED module through the power line edge signal generator, the colored lighting apparatus can be controlled to achieve the controllable random flashing function.

The random mixing and arrangement method with address signals of the present disclosure greatly reduces the difficulty of automated production and processing of the entire product, avoiding the strict requirements of manufacturing process when arranging in order. Furthermore, by including address coding in the LED modules, the power line edge signal generator can generate the address signal to achieve controllable random flashing function.

Compared with the prior art, the colored lighting apparatus of the present disclosure can not only set all LED modules to work in the same color mode but also achieve controllable random flashing function, making the production of the colored lighting apparatus simple and convenient.

DETAILED DESCRIPTION

In some implementations, by transmitting control signals through power lines, a color control light apparatus that only requires a power line and a ground line without additional control signals, can be achieved. By encapsulating LEDs with power line carrier control chips, controllable colored lighting emitting modules with the same appearance as ordinary LEDs are formed, greatly simplifying the production of the final product and improving product performance.

However, these power line carrier control chips usually do not include address coding. As such, many color control light apparatuses can only achieve all-synchronous effects, and cannot achieve controllable random flashing functions.

In the following, with reference to the drawings of various embodiments disclosed herein, various embodiments of the present disclosure will be further described in detail.

Figure 1:
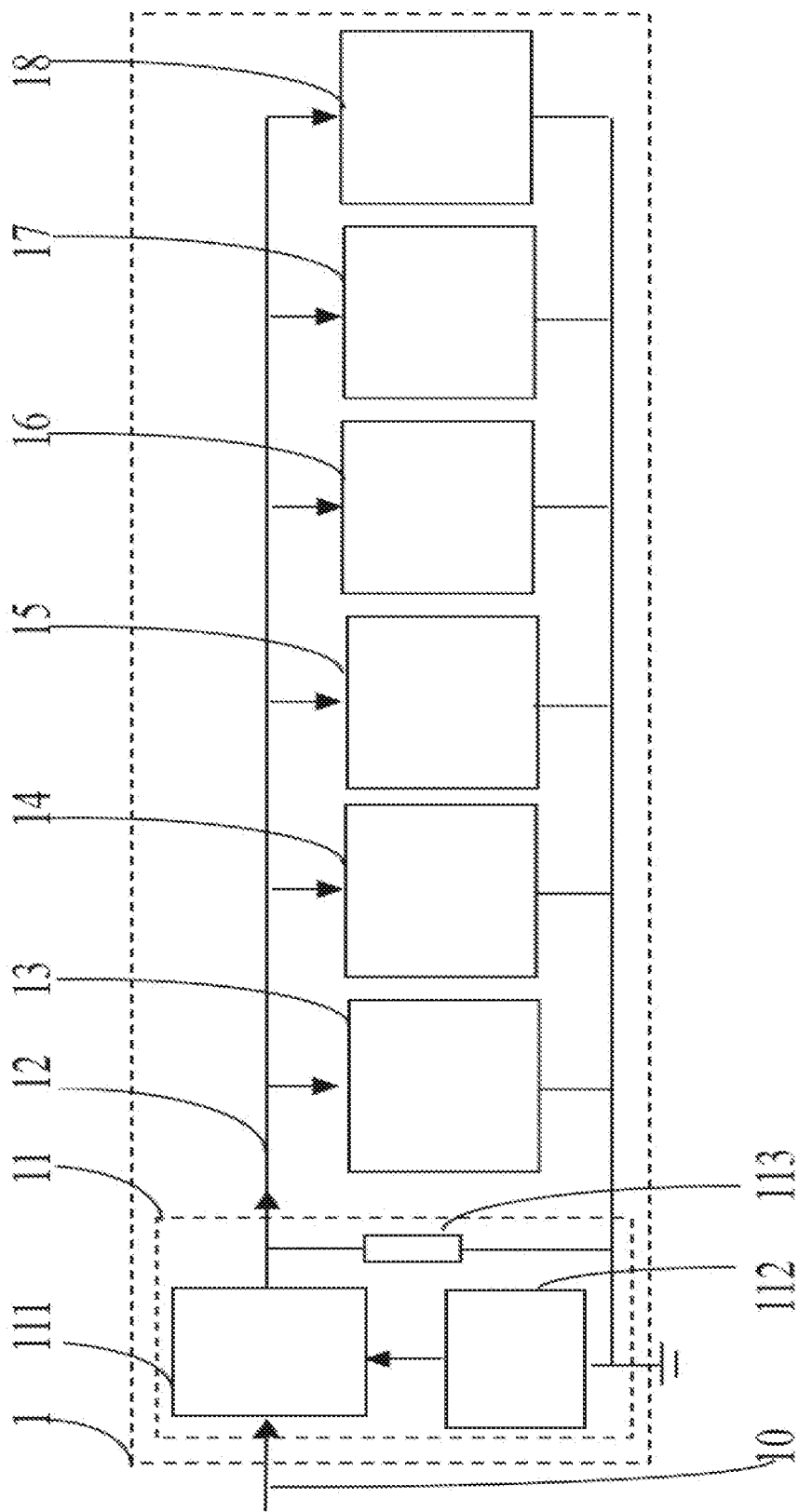
FIG. 1 illustrates a colored lighting apparatus 1 triggered by power line edge signals with mixed multi-codes.

As shown in FIG. 1, the colored lighting apparatus 1 triggered by power line edge signals with multiple codes mixed in this embodiment includes:
  edge signal generator 11, used to generate edge signals and output the generated edge signals loaded onto power line 12;
  the edge signal generator 11 in this embodiment includes a controllable switch 111 and a control circuit 112 connected to the control terminal of the controllable switch. The controllable switch includes a P-channel field-effect transistor CZ2301, whose source is used as an input terminal connected to the DC power supply (+5V power supply) 10, the drain is connected to the power line 12 as an output terminal, and the gate is used as a control terminal connected to the output terminal of the control circuit 112. The output terminal of the controllable switch is also connected to a pull-down resistor 113 (with a resistance of 100 kΩ) and then to ground. When the controllable switch is closed, the level of the edge signal can be quickly pulled down.

The control circuit is based on an MCU (in this embodiment, the STC15F104E microcontroller), which controls the opening and closing (i.e., conduction and cutoff) of the controllable switch 111 through the control signal output by the microcontroller.

When the controllable switch 111 is conducting, the edge signal loaded on the power line 12 is a high level, and when the controllable switch 111 is closed, the edge signal loaded on the power line 12 is a low level.

In this embodiment, there are six LED modules, each of which includes a multi-color LED group and an LED driver that drives the multi-color LED group based on the edge signal output from the power line. The six LED modules in this embodiment are LED module 1 (13) with an address coding of 6, LED module 2 (14) with an address coding of 3, LED module 3 (15) with an address coding of 4, LED module 4 (16) with an address coding of 2, LED module 5 (17) with an address coding of 5, and LED module 6 (18) with an address coding of 1.

In this embodiment, only six LED modules are included, and each LED module has a different address coding and is randomly arranged in the product. It should be understood that in other embodiments, the arrangement order of the address coding of each LED module is random and may be different from the arrangement order in this embodiment. In other embodiments, multiple LED modules can be included, and some LED modules can have the same address coding.

Figure 2:
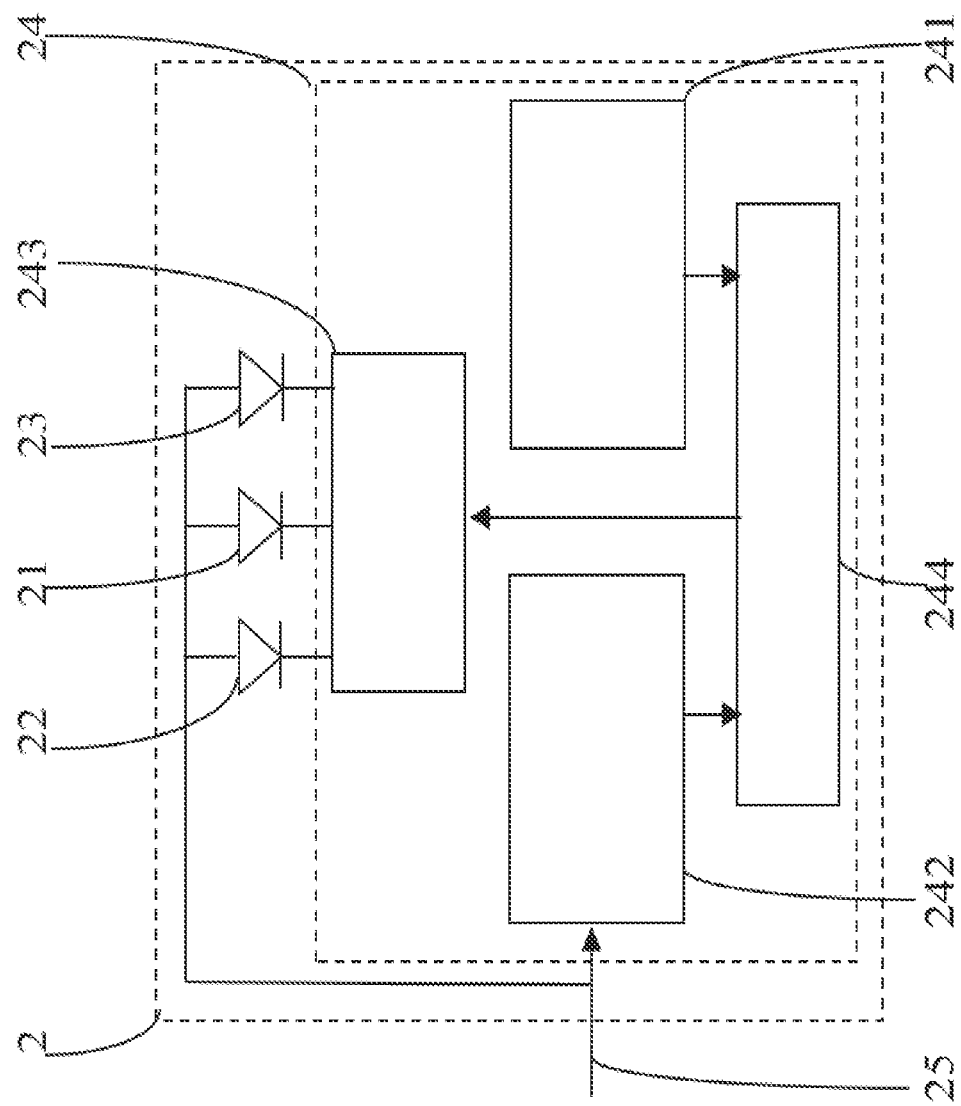
FIG. 2 illustrates an LED module.

As shown in FIG. 2, each LED module 2 includes a red light-emitting diode 21, a green light-emitting diode 22, a blue light-emitting diode 23, and an LED driver 24. The cathodes of the red light-emitting diode 21, the green light-emitting diode 22 and the blue light-emitting diode 23 are connected to the output ports of the LED driver 24, and the anodes of the red light-emitting diode 21, the green light-emitting diode 22, and the blue light-emitting diode 23 are connected to the positive power supply 25 of the LED driver 24.

As shown in FIG. 2, the LED driver 24 includes an LED driver address coding 241, a pulse counting circuit 242, a multi-color LED group driving circuit 243, and a state control circuit 244.

The LED driver 24 counts the number of the first group of pulse signals and the number of the second group of pulse signals controlled by the state control circuit 244. When the number of the first group of pulse signals is equal to the LED driver address coding 241, the state of the red light-emitting diode 21, the green light-emitting diode 22, and the blue light-emitting diode 23 is determined by the number of the second group of pulse signals. When the number of the first group of pulse signals is equal to the LED driver address coding 241, the multi-color LED group driving circuit 243 drives the red light-emitting diode 21, the green light-emitting diode 22, and the blue light-emitting diode 23 by inverting the counting result of the second group of pulse signals.

When the number of the first group of pulse signals is equal to the LED driver address coding 241: when the number of the second group of pulse signals is 1, the red light-emitting diode 21 is on, the green light-emitting diode 22 is off, and the blue light-emitting diode 23 is off; when the number of the second group of pulse signals is 2, the red light-emitting diode 21 is off, the green light-emitting diode 22 is on, and the blue light-emitting diode 23 is off; when the number of the second group of pulse signals is 3, the red light-emitting diode 21 is on, the green light-emitting diode 22 is on, and the blue light-emitting diode 23 is off; when the number of the second group of pulse signals is 4, the red light-emitting diode 21 is off, the green light-emitting diode 22 is off, and the blue light-emitting diode 23 is on; when the number of the second group of pulse signals is 5, the red light-emitting diode 21 is on, the green light-emitting diode 22 is off, and the blue light-emitting diode 23 is on; when the number of the second group of pulse signals is 6, the red light-emitting diode 21 is off, the green light-emitting diode 22 is on, and the blue light-emitting diode 23 is on; when the number of the second group of pulse signals is 7, the red light-emitting diode 21 is on, the green light-emitting diode 22 is on, and the blue light-emitting diode 23 is on; when the number of the second group of pulse signals is 8 or 0, the red light-emitting diode 21 is off, the green light-emitting diode 22 is off, and the blue light-emitting diode 23 is off.

Figure 3:
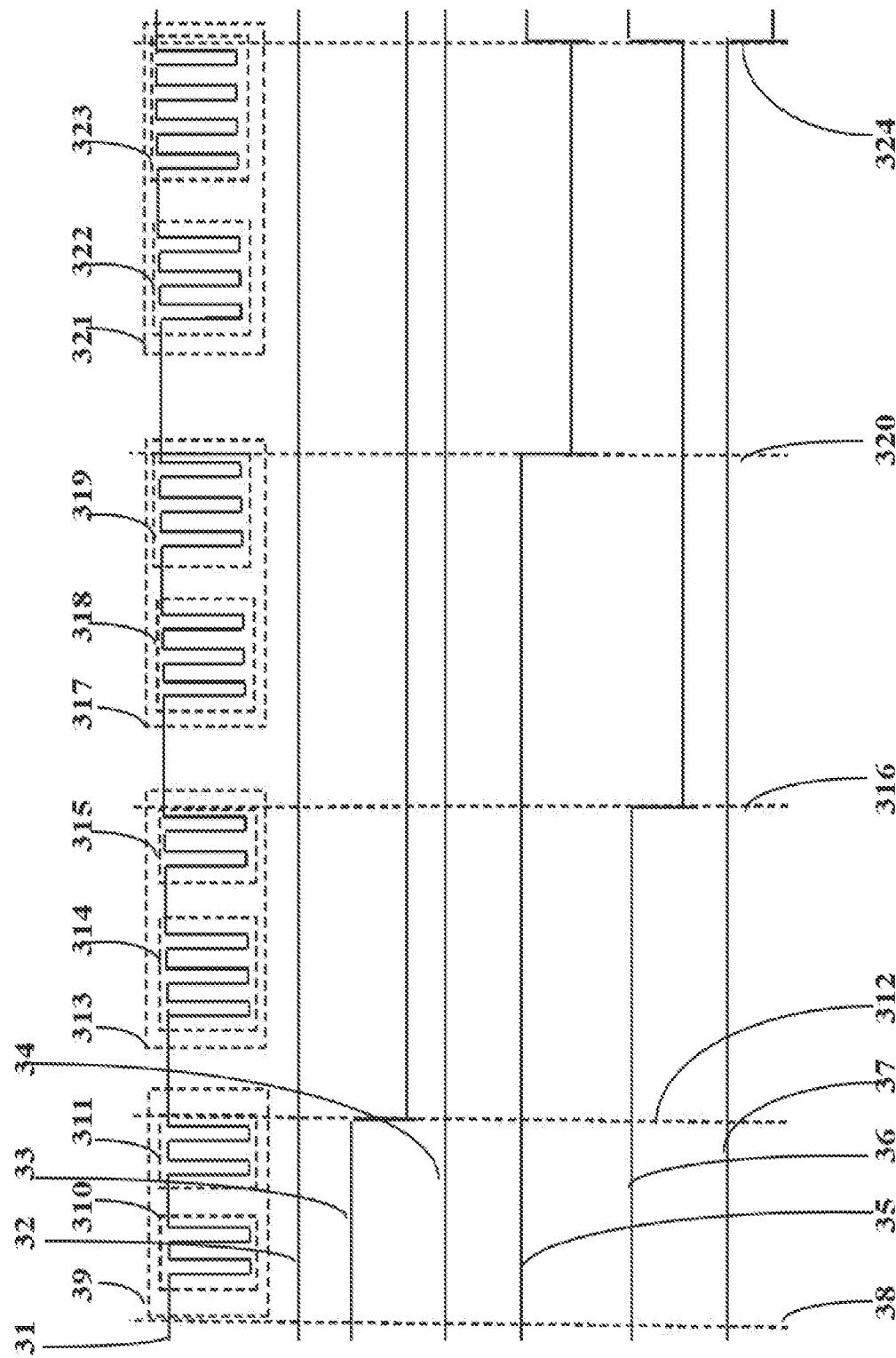
FIG. 3 illustrates shows the waveform diagram of the address signal and the light control signal loaded from the power line.

As shown in FIG. 3, this embodiment's control method is illustrated by using partial output waveforms of LED module 2 (address code=3) and LED module 4 (address code=2), based on the partial signal waveform generated by the edge signal generator 11 of this embodiment.

As shown in FIG. 3, during the initial stage (to the left of the dotted line 38), the partial signal (31) output by the edge signal generator 11 in this embodiment, as well as the red LED control signal (32), green LED control signal (33), and blue LED control signal (34) of LED module 4, and the red LED control signal (35), green LED control signal (36), and blue LED control signal (37) of LED module 2 are all high, and the red, green, and blue LEDs of both LED modules are all off.

The edge signal generator 11 then outputs the first set of control signals (39), which includes an address signal pulse group (310) and a light control signal pulse group (311). The address coding of LED module 4 is equal to the address pulse group (310), so at the position indicated by the dotted line (312), the first set of control signals (39) is responded to, and the green LED of LED module 4 is set to on while the other colors remain off.

The edge signal generator 11 outputs the second set of control signals (313), which includes an address signal pulse group (314) and a light control signal pulse group (315). The address coding of LED module 2 is equal to the address pulse group (314), so at the position indicated by the dotted line (316), the second set of control signals (313) is responded to, and the green LED of LED module 2 is set to on while the other colors remain off.

The edge signal generator 11 then outputs the third set of control signals (317), which includes an address signal pulse group (318) and a light control signal pulse group (319). The address coding of LED module 2 is equal to the address pulse group (318), so at the position indicated by the dotted line (320), the third set of control signals (317) is responded to, and the red LED of LED module 2 is set to on while the other colors remain off.

The edge signal generator 11 outputs the fourth set of control signals (321), which includes an address signal pulse group (322) and a light control signal pulse group (323). The address coding of LED module 2 is equal to the address pulse group (322), so at the position indicated by the dotted line (324), the fourth set of control signals (321) is responded to, and the red and green LEDs of LED module 2 are set to off, while the blue LED is set to on, and the colors of LED module 4 remain unchanged.

Figure 4:
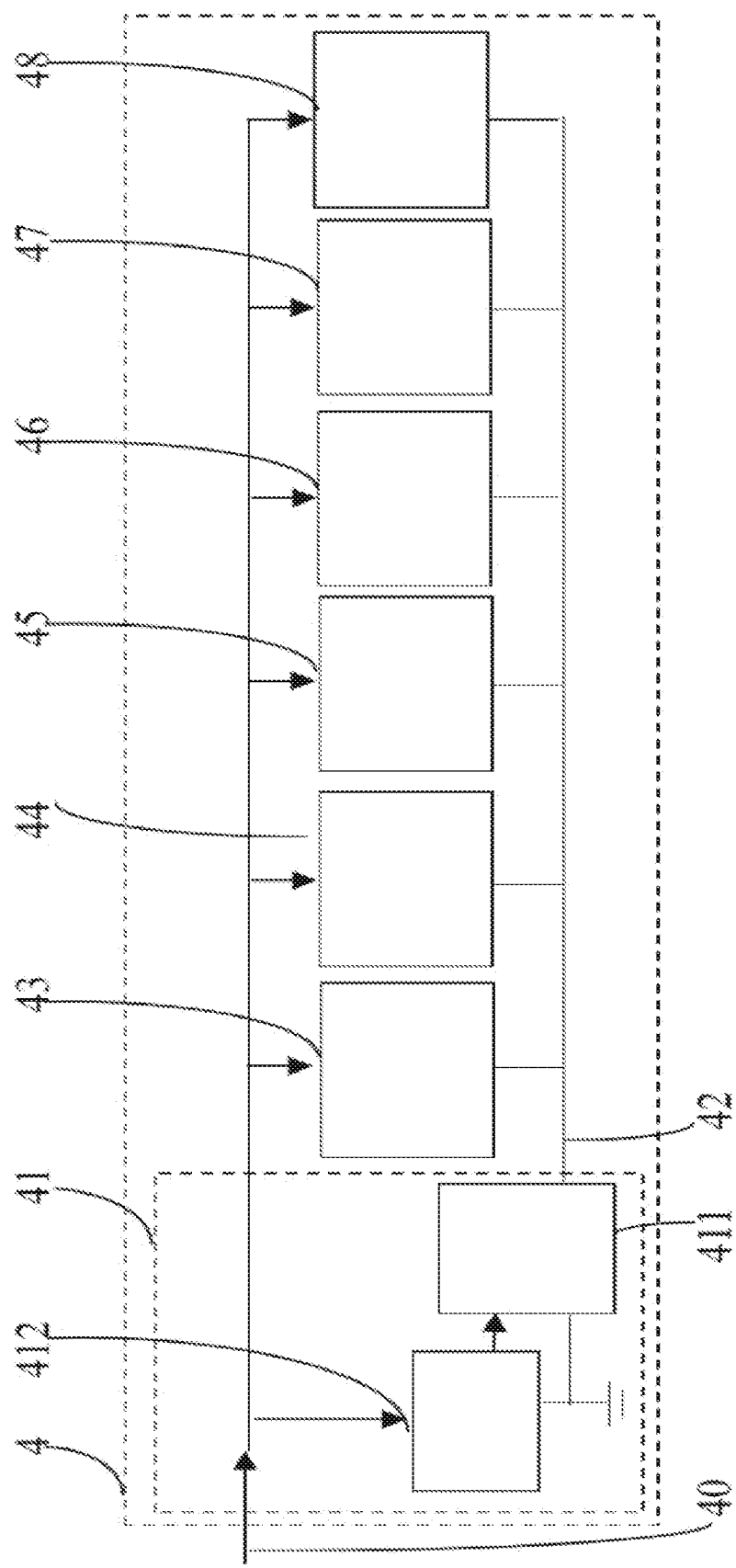
FIG. 4 illustrates a colored lighting apparatus 4 triggered by power line edge signals with mixed multi-codes.

As shown in FIG. 4, the colored lighting apparatus with mixed multi-codes triggered by power line edge signals in this embodiment includes:

An edge signal generator 41 for generating edge signals and loading the generated edge signals onto the power line 42 for output;

The edge signal generator 41 of this embodiment includes a controllable switch 411 and a control circuit 412 connected to the control terminal of the controllable switch. The controllable switch includes an N-channel field-effect transistor CJ2302, whose source is grounded and serves as the input terminal, whose drain is connected to the power line 42 as the output terminal, and whose gate serves as the control terminal and is connected to the output terminal of the control circuit 412.

The control circuit 412 is implemented based on an MCU (in this embodiment, the STC15F104E microcontroller), which controls the conduction and cutoff (i.e., on and off) of the controllable switch 411 through control signals output by the MCU. The power supply for the control circuit 412 is provided by a DC power supply (+5V power supply 40) in this embodiment, but in other embodiments, it can be supplied by a different power supply circuit.

When the controllable switch 411 is conducting, the potential on the power line 42 is lower than that of the DC power supply 40, and the loaded edge signal is high. When the controllable switch 411 is turned off, the potential on the power line 42 is equal to that of the DC power supply 40, and the loaded edge signal is low.

This embodiment includes 6 LED modules, each consisting of a multi-color LED group and an LED driver that drives the multi-color LED group based on the edge signal output from the power line. The 6 LED modules in this embodiment are LED module 1 (43) with an address code of 5, LED module 2 (44) with an address code of 2, LED module 3 (45) with an address code of 3, LED module 4 (46) with an address code of 1, LED module 5 (47) with an address code of 4, and LED module 6 (48) with an address code of 6.

This embodiment realizes a colored lighting apparatus with mixed multi-codes triggered by power line edge signals, which is suitable for machine automation production and reduces manual labor, improving production efficiency. On the one hand, all LED modules can be set to work in the same color mode, and on the other hand, the controllable random flashing function can be achieved.

The above is only the preferred embodiment of the present disclosure and should not be used to limit the present disclosure. Any modification, equivalent replacement, improvement, etc. made within the spirit and principle of the present disclosure should be included in the scope of the present disclosure's protection.

The invention claimed is:

1. A lighting apparatus with mixed multi-codes triggered by power line edge signals, comprising:
   a power line edge signal generator for generating and loading address signals and light control signals onto a power line; and
   a plurality of light-emitting diode (LED) modules, each LED module includes a multi-color LED group and an LED driver for driving the multi-color LED group based on the address signals and the light control signals loaded onto the power line;
   wherein
   the LED driver includes a LED driver address coding;
   the LED driver of the LED module receives the address signals and the light control signals, and responds to drive the multi-color LED group based on the light control signals when the address signals are equal to the LED driver address coding;
   the multiple LED modules include two or more LED modules, and with two or more LED driver address codings; and
   the multiple LED modules are randomly mixed and randomly arranged according to the LED driver address codings to thereby achieve controllable random flashing.

2. The lighting apparatus of claim 1, wherein the power line edge signal generator generates the address signals the light control signals.

3. The lighting apparatus of claim 2, wherein the multi-color LED group includes a red light emitting diode (R LED), a green light emitting diode (G LED), and a blue light emitting diode (B LED), and the LED driver is connected to the R LED, the G LED, and the B LED.

4. The lighting apparatus of claim 3, wherein the power line edge signal generator includes a controllable switch and a control circuit; the input of the controllable switch is connected to a DC power supply, the output of the controllable switch is connected to the power line, and the control terminal of the controllable switch is connected to the control circuit; the control circuit controls the controllable switch to generate a pulse signal from ON to OFF, or from OFF to ON; and
   the LED modules are electrically connected to form a common anode and a common cathode, and are connected between the common anode and the common cathode; the common anode is connected to the power line, and the common cathode is connected to ground.

5. The lighting apparatus of claim 3, wherein the LED modules are electrically connected to form a common anode and a common cathode, and are connected between the common anode and the common cathode; and the power line edge signal generator of the lighting apparatus includes a controllable switch and a control circuit; the input of the controllable switch is connected to the common cathode, the output of the controllable switch is connected to ground, and the control terminal of the controllable switch is connected to the control circuit; the control circuit controls the controllable switch to generate a pulse signal from ON to OFF, or from OFF to ON; the common anode formed by the LED modules is connected to the DC power supply, and the input of the controllable switch is connected to the common cathode formed by the LED modules.

6. The lighting apparatus of claim 5, wherein there is no current path from the DC power supply, the multiple LED modules, the controllable switch to ground when the controllable switch is turn to OFF.

7. The lighting apparatus of claim 6, wherein the power line edge signal generator generates two sets of pulse signals by controlling the controllable switch from ON to OFF, or from OFF to ON; the first set of pulse signals is the address signals, and the second set of pulse signals is the light control signals.

8. The lighting apparatus of claim 7, wherein the pulse number in the first set of pulse signals is the address signals, and the LED driver counts the pulse number in the first set of pulse signals; and the second set of pulse signals is the light control signals, and the LED driver counts the pulse number in the second set of pulse signals; the state of the multi-color LED group is set by the pulse number in the second set of pulse signals when the pulse number in the first set of pulse signals is equal to the LED driver address coding.

9. The lighting apparatus of claim 8, where the LED driver includes an LED driver address coding, a pulse counting circuit, a multi-color LED group driving circuit, and a status control circuit; and the pulse counting circuit and the multi-color LED group driving circuit of the LED driver are controlled by the status control circuit; the pulse counting circuit counts the pulse number in the first sets of pulse signals and the second sets of pulse signals;

when the pulse number in the first set of pulse signals is equal to the LED driver address coding, the state of the multi-color LED group is determined by the pulse number in the second set of pulse signals.

10. The lighting apparatus of claim 5, wherein there is a current path from the DC power supply, the multiple LED modules to the ground that does not pass through the controllable switch when the controllable switch is turn to OFF.

11. The lighting apparatus of claim 5, wherein an encoding information is corresponded to the high level width or the low level with of the pulse signals.

12. The lighting apparatus of claim 11, wherein different lengths of high level, or different lengths of low level, or a combination of different lengths of high level and low levels, represent different logic encoding information.

* * * * *